(12) United States Patent
Raspanti et al.

(10) Patent No.: US 6,232,412 B1
(45) Date of Patent: May 15, 2001

(54) BUILD-UP SUPPRESSOR AGENTS, COMPOSITIONS CONTAINING THEM AND METHOD OF USE IN POLYMERIZATION PROCESSES

(75) Inventors: Giuseppe Raspanti; Matteo Zanotti Russo, both of Bergamo (IT)

(73) Assignee: 3V Inc., Weehawken, NJ (US)

( * ) Notice: Subject to any disclaimer, the term of this patent is extended or adjusted under 35 U.S.C. 154(b) by 0 days.

(21) Appl. No.: 09/319,174

(22) PCT Filed: Jul. 29, 1997

(86) PCT No.: PCT/EP97/04098

§ 371 Date: Jun. 3, 1999

§ 102(e) Date: Jun. 3, 1999

(87) PCT Pub. No.: WO98/24820

PCT Pub. Date: Jun. 11, 1998

(30) Foreign Application Priority Data

Dec. 4, 1996 (IT) .............................. MI96A2548

(51) Int. Cl.⁷ ............................ C08F 2/00; C08F 220/68
(52) U.S. Cl. ........................... 526/74; 526/208; 526/213; 526/315; 526/318.1; 526/318.2; 526/318.25
(58) Field of Search ............................ 526/74, 213, 208, 526/315, 318.1, 318.2, 318.25

(56) References Cited

FOREIGN PATENT DOCUMENTS

| 0 598 537 A1 | * | 5/1994 | (EP) . |
|---|---|---|---|
| 0 598 537 | | 5/1994 | (EP) . |
| 0 695 761 | | 2/1996 | (EP) . |
| 0 695 761 A2 | * | 2/1996 | (EP) . |
| 2 101 498 | | 1/1983 | (GB) . |
| 82 00645 | | 3/1982 | (WO) . |

* cited by examiner

*Primary Examiner*—David W. Wu
*Assistant Examiner*—R. Harlan
(74) *Attorney, Agent, or Firm*—Birch, Stewart, Kolasch & Birch, LLP

(57) ABSTRACT

The invention relates to build-up agents which comprise a condensation product among an aldehyde, a phenol compound and an aromatic carboxylic acid, hydroxy-substituted on the aromatic nucleus. The products are particularly effective in reducing or suppressing the build-up formation in the polymerization of vinyl chloride or vinyl acetate, other copolymerizable substances being optionally present. Further objects of the invention are compositions containing the above agents, their use as build-up agents, methods for their preparation and the products obtained therefrom, the polymerization processes carried out in reactors whose inner walls are coated with these agents and polymers obtained from these process.

16 Claims, No Drawings

BUILD-UP SUPPRESSOR AGENTS, COMPOSITIONS CONTAINING THEM AND METHOD OF USE IN POLYMERIZATION PROCESSES

The present invention relates to build-up suppressor agents and compositions containing such suppressor agents, which are capable of inhibiting the formation of build-up in vinyl acetate or vinyl chloride polymerization processes, or in polymerization processes utilizing a mixture thereof, with or without other vinyl monomers polymerizable therewith, which processes are effected in aqueous suspension, aqueous emulsion or in bulk.

In all the above polymerization processes, part of the formed polymer tenaciously adheres to the reactor walls, thus forming so-called "build-up" (otherwise said "scale"), with deleterious effects toward both the final product itself, due to small fragments of build-up which, by detaching from the reactor walls, can be included in the polymerized product and the safety of the reaction because the build-up slows the thermal exchange of the wall giving rise to safety problems due to overheating.

This build-up is a drawback for the polymerization operations since it is necessary to clean the walls after each repeated reaction.

This cleaning is costly as it decreases the plant output and is dangerous for the operators due to the toxicity of the monomers, particularly vinyl chloride.

A number of products and techniques have been developed to mitigate this problem, all of which are based on coating the reactor walls with products which should inhibit adhesion of the build-up or even its formation, as an example by preventing the polymerization of the monomers on the reactor walls. Phenol-formaldehyde condensation products (GB 1439339; JP 54-107991; CA 1181899; EP 0052421) or dye mixtures (alizarin, xanthones, natural flavonoids, naphthoquinones, hydroxyanthraquinones and others) with film-forming elements such as polysaccharides, polyvinyl alcohols, polyvinylpyrrolidone were proposed as reactor wall coating. See for example patents JP 04342701; JP 04154804; JP 04154801; JP 04154805; JP 04108805; JP 04159302 and JP 04031402.

EP 0 614 915 suggests the use of condensation product between quinones and heterocyclic compounds having at least two amino groups, whereas in EP 0 606 013 there are described, among others, condensation products between quinones and particular diamino-diphenyls substituted with carboxylic or sulfonic groups. Finally, in EP 0 695 761, it is described the use of products obtained by condensing a "phenol" compound, such as, for example, phenol or 1-naphthol, in the presence of an aliphatic bicarboxylic acid.

The products more widely used seem to be those described in EP 0 052 421. However, although remarkable results as to suppression of build-up formation are achieved, those agents do not allow carrying out an appreciable number of repeated polymerizations.

All these build-up suppressor agents can be applied in a number of manners, which depend on the nature of the product and on their capacity of adhering to the reactor walls.

The more common methods provide coating by painting or spraying, in which case it shall be necessary to prepare suitable solutions of the same products, for example aqueous solutions. In case of spraying, nitrogen or water vapour at 5–15 bar pressures can be used as propellant.

As said above, the performances of these products can be enhanced with the use of film-forming agents such as, for example, polysaccharides or highly hydrolyzed polyvinyl alcohols.

It has now been found, and this is an object of the present invention, that build-up suppressor agents particularly effective in polymerization processes of vinyl chloride or of vinyl acetate, or of mixtures thereof, in the presence or in absence of other monomers or polymers polymerizable with them, comprise condensation products among an aldehyde (A), a phenol compound (B) and an aromatic carboxylic acid hydroxy-substituted on the aromatic nucleus (C). These agents, as such or in the form of compositions suitable for coating, have demonstrated to be capable of suppressing in a practically complete manner, the build-up formation on the inner reactor walls and, in general, of reaction systems, also when applied in amount definitely lower than those normally used, as well as to allow the carrying out of repeated polymerizations without having to apply, each time, the agents before each run and without noticing significant variations of build-up formation between the first and the last reaction.

These agents are endowed with another favourable characteristic, i.e. they have a reduced sensitivity with respect to pH variations in polymerization processes, and possess a remarkable shelf-life.

Moreover, the polymers obtained show better physical characteristics.

Therefore, a further object of the present invention comprises compositions containing one or more of the above build-up suppressor agents.

Another object of the present invention is the use of one or more of the above build-up suppressor agents in polymerization processes of vinyl chloride or of vinyl acetate, or of their mixtures, in presence or in absence of other monomers or polymers polymerizable with them.

Still another object of the present invention is a method for suppressing build-up formation in polymerization processes of vinyl chloride or of vinyl acetate, or of their mixtures, in presence or in absence of other monomers or polymers polymerizable with them, which comprises coating the inner walls of a polymerization reactor with one or more of the above build-up suppressor agents.

The present invention further comprises a polymerization process of vinyl chloride or vinyl acetate, or their mixtures, in the presence or in absence of other monomers or polymers polymerizable with them, effected in a reactor whose inner walls are coated with one or more of the above build-up suppressor agents, and the polymers obtained by means of said process.

Finally, a further object of the present invention is a polymerization reactor whose inner walls are coated with one or more of the above build-up suppressor agents.

Compound (A) can be any aldehyde capable of condensing at the ortho- and/or para-positions with respect to a hydroxyl present on an aromatic nucleus. Many aldehydes showed themselves suitable to this purpose. Preferably, formaldehyde, or its precursors, such as paraldehyde or paraformaldehyde, aliphatic aldehydes having from 2 to 5 carbon atoms, benzaldehyde or heterocyclic aldehydes such as, for example, furfurol are used. A phenol compound (B) can be any mono- or polyhydroxylated phenol in which at least two of the ortho- and/or para-positions with respect to the hydroxy group or groups are free, for example, phenol, cresol, ethylphenol, resorcinol, pyrocathecol, hydroquinone, pyrogallol or bisphenol A, or a compound of formula (I):

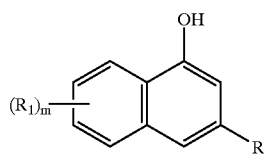

(I)

wherein m is 1, 2 or 3, and R and $R_1$ are independently selected from the group consisting of hydrogen, halogen, $(C_{1-5})$ alkyl, hydroxy and carbo$(C_{1-5})$alkoxy. Phenol, resorcinol or 1-naphthol are preferably used. Finally, compound (C) is a hydroxylated aromatic carboxylic acid of formula II:

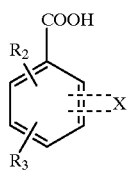

(II)

wherein $R_2$ is selected from the group consisting of hydrogen, hydroxy, $(C_{1-5})$ alkoxy, $(C_{1-5})$ alkyl, hydroxy $(C_{1-5})$ alkyl, halogen, phenyl and hydroxyphenyl; $R_3$ has the same meanings of $R_2$ with the exclusion of hydrogen; x and the dotted lines, taken together, represent either a divalent residue ortho-condensed with the benzene ring of formula III:

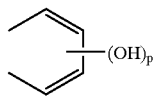

(III)

wherein p is an integer selected from 1 or 2, or they represent nothing; with the following provisos:
  a) when x and the dotted lines, taken together, represent the residue of formula III, at least two of the ortho- and/or para-positions with respect to the hydroxyl group or groups must be free;
  b) when x and the dotted lines, taken together, represent nothing, at least one of $R_2$ or $R_3$ represent hydroxy, and at least two of the ortho- and/or para-positions with respect to the hydroxyl group or groups must be free.

Preferably, monohydroxy benzoic acids are used such as, for example, salicylic acid and 4-hydroxy-benzoic acid, dihydroxy benzoic acids such as, for example α-, β- and γ-resorcylic acids, 2,3-dihydroxy-benzoic acid, 2,5-dihydroxy-benzoic acid, monohydroxylated alkoxy benzoic acids such as, for example, 2-hydroxy-5-methoxy-benzoic acid, hydroxy naphthoic acids such as, for example, 6-hydroxy-2-naphthoic acid.

The molar ratios of compounds (A), (B) and (C) as defined above can range within very wide limits, but this does not affect at all the excellent properties of the build-up suppressor agents of the present invention. Preferably, the molar ratios of aldehyde (A), phenol compound (B) and aromatic carboxylic acid hydroxy-substituted on the aromatic nucleus (C) are comprised, respectively, between 0.6–1.2:0.05–0.95:0.95–0.05. Still more preferably, the aldehyde is used in a molar amount not exceeding the sum of the moles of the compounds (B) and (C).

The build-up suppressor agents of the present invention can be prepared according to different procedures. In a first embodiment, the agents are obtainable reacting the compounds (A), (B) and (C) in aqueous solution in the above molar ratios, in the presence of a strong basic agent such as, for example, sodium or potassium hydroxide, so as to carry out the reaction at a pH ranging from about 8 to about 13.5. The compounds (A), (B), and (C) can be loaded together in the reaction vessel; alternatively a basic solution of the compounds (B) and (C) is prepared firstly and, after having heated at the temperatures indicated below, the component (A) is added. The temperature at which the reaction is carried out is, normally, between about 40 and about 120° C., and, preferably, between about 70 and about 100° C. The reaction times are not critical and can be advantageously comprised between about 1 and about 8 hours.

Alternatively, an aqueous basic solution (pH between about 8 and about 13.5), of compound (B) or of compound (C) is added to, or with an aqueous solution of compound (A), at a temperature comprised between about 5 and about 30° C. After having stirred for about 1–3 hours at room temperature, an aqueous basic solution (pH as above reported) respectively of compound (C) or of compound (B) is added to the so obtained dimethylol compound and the resulting mixture is warmed to the temperature and for the times above described. These reactions can also be carried out in situ, namely on the reactor walls or, more in general, on any other part of reaction system which can be in contact with vinyl chloride or acetate, their mixtures or other monomers or polymers polymerizable with them, also in the form of vapours.

The methods for preparing the build-up suppressor agents of the invention and the build-up suppressor agents so obtained are a further object of the invention. These agents are polycondensated substances among the compounds (A), (B), and (C); they have a not too high molecular weight, and their structure is not well definable.

To the purpose of favouring the adhesion of the build-up suppressor agents of the present invention to those parts of the reaction system wherein it is desired that such adhesion occur, suitable surfactants or film forming agents such as, for example, polyvinyl alcohols with a high content of hydroxyls can be used.

Polyvinyl alcohols having a hydrolysis degree not lower than 96%, and a 4% water viscosity of 20 mPa.s or more, preferably 40 mPa.s or more, measured with a Hoppler viscosimeter, are preferred.

If used, these surfactants or film forming agents are mixed together with the obtained build-up suppressor agents in amounts ranging from about 2 and about 20% by weight, calculated on the build-up suppressor agents.

Other than those already cited, another advantage of the build-up suppressor agents of the invention lies in the fact that they can be obtained in solid form, are easy to handle and easily preservable. Therefore, at the moment of their application on the walls of the polymerization reactor, or of those other parts of the reaction system wherein the adhesion is desired, one can use one or more of the agents as such, as obtainable by the methods above described, or one or more of the agents recovered in the solid state and prepare with them a suitable composition.

Preferably, this composition is in liquid form, and can be prepared by dissolving one or more of the build-up suppressor agents of the invention in water and a basic agent, at a pH ranging from about 8 to about 13.5, or in a suitable organic solvent, optionally in the presence of the surfactants and film forming agents above mentioned.

The concentration of the build-up suppressor agents in the compositions for use in the application on the reactor walls or, more in general, of reaction system, is comprised between about 0.2 and about 15%, preferably between about 0.4 and about 9% calculated on the weight of the solution.

The quantity of the build-up suppressor agent of the present invention which must be applied on the walls of the reactors is particularly low, not more than 5 g of active substance per $m^2$ of surface and up to not less than 0.02 g per $m^2$ of surface, preferably up to not more than 3 g per $m^2$ and up to not less than 0.1 g per $m^2$ of surface.

In the case of liquid aqueous compositions, the build-up suppressor agent, after having been dissolved by means of a basic agent, such as for example sodium hydroxide or potassium hydroxide, or also by means of ammonia or lower aliphatic amines or mono- or triethanolamine, is generally applied by means of the well known water vapour- or pressurized nitrogen-spraying technique, but it can also be applied by brushing or, in the case of vinyl chloride, using the same monomer as carrier. The application can be carried out on cold or hot walls, using solutions previously heated or at room temperature, although the temperature is not critical. It can be also convenient to heat the inner walls of the reaction system after the application of the build-up suppressor agent.

The vinyl chloride or acetate polymerization dealt with in the present invention is either a homopolymerization or a copolymerization among them, in the presence or absence of one or more monomers or polymers polymerizable with them, such as for example other vinyl esters or aryl, alkyl or cycloalkyl esters of unsaturated mono- and polycarboxylic acids having 3–15 carbon atoms such as methyl acrylate, butyl methacrylate, acrylonitrile, the methacrylonitrile, unsaturated diesters, such as the diethyl maleate, allyl esters, such as allyl acetate, α-olefins, such as ethylene and propylene, vinyl ethers and styrene compounds. Moreover, the copolymerizations comprise also the polymerization of vinyl chloride in the presence of preformed polymers, optionally in the presence of grafting agents, to form grafted vinyl chloride polymers. Examples of these preformed polymers suitable for forming grafted vinyl chloride polymers comprise poly-2-ethylhexyl-acrylate, poly-n-butyl-acrylate and olefins/vinyl esters copolymers, such as ethylene/vinyl acetate copolymers.

The build-up suppressor agents of the present invention showed to be particularly effective in the case of aqueous suspension or aqueous emulsion polymerization, but also in the case of bulk polymerization a remarkable reduction of scales adhering to the walls is observed.

In the vinyl acetate and/or chloride suspension homo- and copolymerization suspending agents having colloido-protective properties can also be used, such as for example partially hydrolyzed polyvinyl acetates, cellulose ethers, gelatin, sorbitol esters of fatty acids.

The used amounts generally vary between 0.05 and 2% by weight calculated on the total of the used monomers.

In the emulsion polymerization, surfactants agents, such as polyglycol ethers of nonylphenol or sodium or ammonium salts of $C_{12}$–$C_{18}$ fatty acids, of alkylphosphates, of alkylsulfosuccinates, of alkylbenzene sulfonates, of sulfonated olefins, of sulfuric esters of fatty alcohols are used as emulsifiers agents.

The used amounts generally vary between 0.05 and 5% by weight calculated on the total of the used monomers.

Any suitable polymerization initiator, which is soluble in the used vinyl monomers can be employed. Examples of these catalysts, in the polymerization, are peroxides such as lauroyl peroxide, acetylcyclo-hexylsulfonyl peroxide, azo compounds, such as azobis(dimethylvaleronitrile) and peroxidicarbonates such as dicetyl peroxidicarbonate, diisopropyl peroxidicarbonate, bis-(4-tert-butyl-cyclohexyl)-peroxidicarbonate and the like. These initiators and any other conventional agent can be used in the usual amounts of 0.01–1% w/w on the total of the monomers used. In the emulsion polymerization oil-soluble initiators can be used, such as diacyl or dialkyl peroxides such as lauroyl or benzoyl peroxide, peresters such as t-butyl peroxipivalate or t-butyl per-2-ethylhexanoate, peroxidicarbonate or dicetyl peroxidicarbonate or hydrosoluble redox initiator systems based on persulfates, hydrogen peroxide, hydroperoxides combined with sodium metabisulfite, sodium formaldehyde sulfoxilate and the like.

The operating conditions for the polymerization are those well known in the art and usually employed for emulsion, suspension and bulk polymerization of vinyl acetate and chloride, or of their mixtures, in the presence or absence of one or more monomers or polymers polymerizable with them.

The temperatures are in the range between 40 and 80° C. and the pressure is generally comprised between 5 and 14 bar for vinyl chloride, and between 65 and 95° C. and atmospheric pressure for vinyl acetate.

The following examples further illustrate the invention.

EXAMPLE 1

Preparation of a build-up suppressor agent

In a 2 liter glass reactor, equipped with stirrer, thermometer and bubble reflux condenser, 670 ml of water, 77 g (0.5 moles) of 3,5-dihydroxy-benzoic acid [(α-resorcylic acid), compound (C)], and 72 g (0.5 moles) of 1-naphthol [compound (B)] were loaded. The obtained suspension was added with 62 g (1.55 moles) of NaOH pellets and stirring was continued up to complete dissolution. Then, 90 g of a 30% formaldehyde [compound (A), 27 g, 0.9 moles] aqueous solution were slowly added, while continuously stirring, keeping the temperature below 50° C. Once the addition was finished, temperature was brought to 85° C. and reaction mixture was kept at this temperature, under stirring, for about 3 hours. An aqueous solution of the build-up suppressor agent at a weight concentration of 20% was obtained.

This solution, after optional cooling at room temperature, can be brought to the desired concentration for the intended use as described before. If desired suitable surfactants or film forming agents may be added. Alternatively, by acidifying, filtering and drying the build-up suppressor agent in the solid state can be obtained.

EXAMPLES 2–7

Operating according to the procedure described in the preceding Example, build-up suppressor agents were prepared starting from the same compounds (A),(B), and (C) in molar ratios indicated below.

| EX. | Compound (C) (moles) | Compound (B) (moles) | Compound (A) (moles) |
|---|---|---|---|
| 2 | 0,1 | 0,9 | 0,9 |
| 3 | 0,05 | 0,95 | 0,9 |
| 4 | 0,95 | 0,05 | 0,9 |
| 5 | 0,25 | 0,75 | 0,9 |

-continued

| EX. | Compound (C) (moles) | Compound (B) (moles) | Compound (A) (moles) |
|-----|----------------------|----------------------|----------------------|
| 6   | 0,5                  | 0,5                  | 0,8                  |
| 7   | 0,75                 | 0,25                 | 1                    |

EXAMPLE 8

Preparation of a build-up suppressor agent

The procedure of the Example 1 was repeated starting from 0.1 moles of 2,4-dihydroxy-benzoic acid (C), 0.9 moles of 1-naphthol (B) and 0.9 moles of formaldehyde (A).

EXAMPLES 9–18

Build-up suppressor agents were prepared operating according to the methods described in the preceding Examples, starting from the compounds (A), (B) and (C) reported below. The molar ratios of the three components are also indicated.

| EX. | (C): acid- | (B) | (A) | (C):(B):(A) |
|-----|------------|-----|-----|-------------|
| 9   | 2,3-dihydroxy-benzoic | 1-naphthol | formaldehyde | 0.5:0.5:0.9 |
| 10  | 3,5-dihydroxy-benzoic | 1-naphthol | acetaldehyde | 0.75:0.25:0.9 |
| 11  | 3,5-dihydroxy-benzoic | phenol | formaldehyde | 0.1:0.9:1 |
| 12  | 3,5-dihydroxy-benzoic | hydroquinone | formaldehyde | 0.4:0.6:0.9 |
| 13  | 2,6-dihydroxy-benzoic | 1-naphthol | formaldehyde | 0.5:0.5:0.9 |
| 14  | 3,5-dihydroxy-benzoic | o-cresol | formaldehyde | 0.3:0.7:1 |
| 15  | 6-hydroxy-2-naphthoic | phenol | formaldehyde | 0.95:0.05:1 |
| 16  | 6-hydroxy-2-naphthoic | resorcinol | formaldehyde | 0.95:0.05:0.9 |
| 17  | 3,5-dihydroxy-benzoic | 1,3-dihyroxynaphthalene | formaldehyde | 0.8:0.2:1 |
| 18  | 3,5-dihydroxy-benzoic | 1,7-dihyroxynaphthalene | formaldehyde | 0.1:0.9:0.9 |

EXAMPLE 19

Preparation of a build-up suppressor agent

In a 2 liter-glass reactor, equipped with a stirrer, thermometer and bubble reflux condenser, 660 ml of water, 13.8 g (0.1 moles) of 2-hydroxy-benzoic acid [salicylic acid, compound (C)], 129.6 g (0.9 moles) of 1-naphthol [compound (B)] were loaded. The solution was added with 32 g (0.8 moles) of NaOH pellets and stirred up to complete dissolution. 90 g of a 30% formaldehyde aqueous solution [compound (A), 27 g, 0.9 moles] were then slowly added, while stirring, keeping the temperature below 50° C. At the end of the addition, the reaction mixture was warmed to 95° C. and kept at this temperature, under stirring, for about 8 hours.

An aqueous solution of the build-up suppressor agent a concentration by weight of 20% was obtained.

This is solution, after optional cooling at room temperature, can be brought to the desired concentration for the intended use as described above. If desired, suitable surfactants or film forming agents may be added. Alternatively, by acidifying, filtering and drying the build-up suppressor agent in the solid state can be obtained.

EXAMPLES 20–23

Preparation of a build-up suppressor agent

Operating according to the methods described in the preceding Example, build-up suppressor agents were prepared starting from the compounds (A), (B) and (C) reported below. The molar ratios of the three components are also indicated.

| EX. | (C): acid- | (B) | (A) | (C):(B):(A) |
|-----|------------|-----|-----|-------------|
| 20  | 4-hydroxy-benzoic | 1-naphthol | formaldehyde | 0.1:0.9:1 |
| 21  | 2-hydroxy-benzoic | 1-naphthol | formaldehyde | 0.5:0.5:0.7 |
| 22  | 2-hydroxy-benzoic | 1-naphthol | formaldehyde | 0.75:0.25:0.9 |
| 23  | 2-hydroxy-benzoic | 1-naphthol | acetaldehyde | 0.25:0.75:0.9 |

EXAMPLE 24

Preparation of a build-up suppressor agent 40 g (0.4 moles) of 30% formaldehyde were slowly added, at a temperature ranging between 10 and 20° C., with 30.8 g (0.2 moles) of 3,5-dihydroxy-benzoic acid [α-resorcylic acid, compound (C)] dissolved in 100 g of 9% NaOH. Once the addition was terminated, the mixture was stirred for 2 hours between 20 and 25° C., then 36 g (0.25 moles) of 1-naphthol dissolved in 220 g of 6.4% NaOH were added. The reaction mixture temperature was raised at 85–90° C. and stirring at this temperature was continued for 3 hours. An aqueous solution of the build-up suppressor agent at a 20% weight concentration was obtained.

This solution, after optional cooling at room temperature, can be brought to the desired concentration for the intended use as described above. If desired, suitable surfactants or film forming agents may be added. Alternatively, by acidifying, filtering and drying the build-up suppressor agent in the solid state can be obtained.

EXAMPLE 25

Preparation of a build-up suppressor agent 82 g (0.82 moles) of 30% formaldehyde were slowly added, at a temperature below 30° C., to 61 g (0.4 moles) of 2,4-dihydroxybenzoic acid [β-resorcylic acid, compound (C)] dissolved in 476 g of 11% NaOH. Once the addition was terminated, the mixture was stirred for about 30 minutes between 20 and 30° C., then 72 g (0.5 moles) of 1-naphthol and 400 g of water were added. The reaction mixture was heated at 85° C. and stirred at this temperature for 4 hours. An aqueous solution of the build-up suppressor agent at a 16% weight concentration was obtained.

This solution, after optional cooling at room temperature, can be brought to the desired concentration for the intended use as described above. If desired, suitable surfactants or film forming agents may be added. Alternatively, by acidifying, filtering and drying, the build-up suppressor agent in the solid state can be obtained.

EXAMPLES 26–29

Operating according to the procedures described in Examples 24 and 25, the following build up suppressor agents were prepared starting from the compounds (A), (B) and (C) reported below. The molar ratios of the three compounds are also indicated.

| EX. | (C):benzoic acid: | (B) | (A) | (C):(B):(A) |
|-----|-------------------|-----|-----|-------------|
| 26  | 2,4-dihydroxy | 1-naphthol | formaldehyde | 0.5 : 0.4 : 0.85 |
| 27  | 2,4-dihydroxy | 1-naphthol | formaldehyde | 0.6 : 0.4 : 0.9 |

-continued

| EX. | (C):benzoic acid: | (B) | (A) | (C):(B):(A) |
|---|---|---|---|---|
| 28 | 3,5-dihydroxy | 1-naphthol | formaldehyde | 0.35 : 0.65 : 0.9 |
| 29 | 3,5-dihydroxy | 1-naphthol | formaldehyde | 0.4 : 0.6 : 0.85 |

EXAMPLE 30

Polymerization of vinyl acetate monomer (VAM) in aqueous suspension

In a 25 liter-stainless steel reactor, equipped with a reflux condenser and anchor stirrer, the following ingredients were loaded in parts by weight:

| | |
|---|---|
| VAM | 100 |
| water | 50 |
| PVOH (26/88) | 0.05 |
| Acetaldehyde | 0.4 |
| Sodium acetate | 0.01 |
| Benzoyl peroxide | 0.03 |

The mixture was refluxed at atmospheric pressure and the polymerization was carried out for 4 hours until a conversion not lower than 99% was reached.

According to this procedure single polymerizations were carried out in the presence and absence of the build-up suppressor agents of the present invention. The agents were applied in the amount of 0.3 g per m² of reactor surface. The amount of build-up was determined after emptying and washing the reactor, collecting and weighing it.

The obtained results are reported in the following Table 1, and are expressed in parts per million (ppm) with respect to loaded monomers.

TABLE 1

| EX. | Coating Agent of Example | Application | Build up (ppm) |
|---|---|---|---|
| 30A | none | — | 11800 |
| 30B | 1 | spray | 250 |
| 30C | 2 | spray | 300 |
| 30D | 3 | spray | 300 |
| 30E | 5 | spray | 230 |
| 30F | 7 | spray | 180 |
| 30G | 10 | spray | 370 |
| 30H | 14 | spray | 260 |
| 30I | 16 | vapour | 80 |
| 30L | 19 | vapour | 305 |
| 30M | 20 | vapour | 200 |
| 30N | 21 | vapour | 280 |

Similar results were obtained by applying the build-up suppressor agents of the Examples 1, 2, 3, 4, 7, 8, 19, 20 and 21 in the amount of 0.1 g of ingredients active per m² of reactor surface.

EXAMPLE 31

Polymerization of vinyl chloride monomer (VCM) in aqueous suspension

In a 100 liter, internally glass lined, stainless steel reactor, equipped with a Pfaudler stirrer, after having eliminated oxygen, the following ingredients were loaded in parts by weight:

| | |
|---|---|
| VCM | 100 |
| Water | 150 |
| POLIVIC S 404 W™ (3V SIGMA, Italy) | 0.04* |
| POLIVIC SP 808™ (3V SIGMA, Italy) | 0.04* |
| Methylhydroxypropylcellulose | 0.04 |
| Sodium hydrogencarbonate | 0.03 |
| Bis (4-ter-butylcyclohexyl)peroxi dicarbonate | 0.04 |

*as active substance

The system was heated to 54° C., corresponding to a K-value of PVC polymer of about 70, whereas the pressure raised at ⅞ ate, and the polymerization was carried out for about 7 hours. When the pressure was falling by 2–3 ate, the reaction was stopped exhausting the unreacted monomer and isolating it.

According to this procedure, single polymerizations were carried out in the presence and absence of the build-up suppressor agents of the present invention.

The build-up suppressor agents were applied in the amount of 0.5 g per m² of reactor surface. The amount of build-up was determined after emptying and washing the reactor, collecting and weighing it. The results obtained are reported in Table 2 below and are expressed in parts per million (ppm) with respect to the loaded monomer.

TABLE 2

| EX. | Coating Agent of Example | Application | Build up (ppm) |
|---|---|---|---|
| 31A | none | — | 6800 |
| 31B | 1 | spray | traces |
| 31C | 2 | spray | 25 |
| 31D | 3 | spray | 25 |
| 31E | 4 | spray | 10 |
| 31F | 7 | spray | 30 |
| 31G | 8 | spray | 15 |
| 31H | 13 | spray | traces |
| 31I | 19 | spray | 25 |
| 31L | 20 | spray | 10 |
| 31M | 21 | spray | traces |
| 31N | 25 | spray | absent |
| 31O | 27 | spray | absent |

The PVC obtained from Examples 31 B, D, F, H and N, were stabilized against the thermo-oxidative degradation with calcium and zinc stearate and were pressure-molded into plates having 1.5 mm thickness. The yellow index (YI) of the plates was measured with a reflection spectrophotometer obtaining the values reported in Table 3 below:

TABLE 3

| Example | YI |
|---|---|
| 31B | 7.6 |
| 31D | 7.6 |
| 31F | 7 |
| 31H | 7.4 |
| 31N | 7.4 |

The polymers obtained according to the present invention showed better appearance.

EXAMPLE 32

The same polymerization of the preceding example was performed for four consecutive times, in the absence or presence of the build-up suppressor agents. When the latter were present, they were applied in the amount of 0.5 g per m² of reactor surface, only one time before the first polymerization. The amount of build-up was determined after emptying and washing the reactor at the end of the fourth loading, collecting and weighing it.

The results obtained are reported in the Table 4 and are expressed in parts per million (ppm) with respect to the amount of the loaded monomer.

TABLE 4

| EX. | Coating Agent of Example | Application | Build up (ppm) |
|---|---|---|---|
| 32A | none | — | 13000 |
| 32B | 1 | spray | 15 |
| 32C | 2 | spray | 60 |
| 32D | 3 | spray | 65 |
| 32E | 7 | spray | 70 |
| 32F | 13 | spray | 20 |
| 32G | 19 | spray | 45 |
| 32H | 21 | spray | 20 |
| 32I | 8 | spray | traces |
| 32L | 25 | spray | absent |
| 32M | 27 | spray | traces |
| 32N | 28 | spray | absent |

The obtained PVCs were stabilized against the thermo-oxidative degradation with calcium and zinc stearate and were pressure-molded into plates having 1.5 mm thickness. The yellow index (YI) of the plates gave values superimposable to those of the preceding Example.

EXAMPLE 33

Copolymerization vinyl acetate monomer (VAM)/Vinyl esters in aqueous dispersion

In a 25 liter-stainless steel reactor, equipped with reflux condenser and anchor stirrer, 30% of the monomer mixture and 50% of the Redox initiator systems below described in parts by weight were loaded:

| VAM | 70 |
|---|---|
| Dibutyl maleate | 30 |
| Water | 70 |
| Hydroxyethylcellulose (WP 300) | 2 |
| Ethoxylated nonyl-phenol | 2.3 |
| NaHCO$_3$ | 0.07 |
| tert-butylhydroperoxide | 0.18 |
| sodium formaldehyde sulfoxilate | 0.089. |

The mixture was refluxed at atmospheric pressure and the remaining material was loaded in 5 hours at the temperature of 85° C.

After completing the reaction, cooling and unloading the reactor, the latter was washed with water at 5 ate.

According to this procedure, single polymerizations in the presence and in absence of the build-up suppressor agents of the present invention were effected. The agents were applied in the amount of 0.3 g per m² of reactor surface. The amount of build-up was determined after emptying and washing the reactor, collecting and weighing it.

The results obtained are reported in the following Table 5, and are expressed in parts per million (ppm) with respect to the loaded monomers.

TABLE 5

| EX. | Coating Agent of Example | Application | Build up (ppm) |
|---|---|---|---|
| 33A | none | — | 21000 |
| 33B | 1 | spray | traces |
| 33C | 2 | spray | 30 |
| 33D | 5 | spray | 30 |
| 33E | 16 | spray | traces |
| 33F | 19 | spray | 25 |
| 33G | 25 | spray | traces |

EXAMPLE 34

The same copolymerization of the preceding Example was repeated for 3 consecutive times, in the absence or in the presence of the build-up suppressor agents of the present invention. When operating in the presence of the latter, they were applied in the amount of 0.3 g per m² of reactor surface, a single time, before the first polymerization. The amount of build-up was determined after emptying and washing the reactor at the end of the third load, collecting and weighing it. The results obtained are reported in Table 6 and are expressed in parts per million (ppm) with respect to the amount of the loaded monomer.

TABLE 6

| EX. | Coating Agent of Example | Application | Build up (ppm) |
|---|---|---|---|
| 34A | none | — | 38000 |
| 34B | 1 | spray | 30 |
| 34C | 2 | spray | 70 |
| 34D | 15 | spray | 75 |
| 34E | 16 | spray | 25 |
| 34F | 19 | spray | 60 |
| 34G | 25 | spray | traces |

The copolymer obtained from Examples 34B, D, E and G was stabilized against the thermo-oxidative degradation with calcium and zinc stearate and were pressure-molded into plates having 1.5 mm thickness. The yellow index (YI) of the plates was measured with a reflection spectrophotometer obtaining the values reported in Table 7 below:

TABLE 7

| Example | YI |
|---|---|
| 34B | 8.2 |
| 34D | 8 |
| 34E | 8.3 |
| 34G | 8.4 |

The polymers obtained showed a better appearance.

EXAMPLE 35

Polymerization of vinyl chloride monomer (VCM) in aqueous suspension

The inner walls of a stainless-steel polymerization reactor of 40 m³ capacity were coated by means of the steam spraying technique with an aqueous strong alkaline solution of the compound of Example 25, so as to provide an amount of build-up suppressant of 0.75 g/m². Subsequently, the following ingredients were loaded in parts by weight.

| | |
|---|---|
| VCM | 100 |
| Water | 150 |
| POLIVIC(R)S 404 W (3V SIGMA, Italy) | 0.05* |
| GOHSENOL(R)KH 17 (NIPPON GOHSEI, Japan) | 0.055 |
| ALCOTEX(R)72.5 (REVERTEX, UK) | 0.025 |
| sodium hydrogencarbonate | 0.03 |
| bis-(4-tert.-butylcyclohexyl)-peroxi-dicarbonate | 0.03 |
| lauroyl peroxide | 0.04 |

*as active substance

The system was heated to about 54° C., corresponding to a K value of the PVC polymer of about 70, with the pressure raising to 7–8 atmospheres, and the polymerization was carried on for about 6 hours. When the pressure fell down by 2–3 atmospheres, the reaction was stopped venting out and recovering the unreacted monomer.

At least eighty consecutive polymerizations were carried out without cleaning the inner walls of the reactor before each run, but simply rinsing them with water and applying the build-up suppressant before each polymerization as above indicated. No build-up formation was observed.

EXAMPLE 36

The polymerization of the above Example was repeated in a stainless-steel reactor of 100 m$^3$ equipped with a condenser, coating the inner walls of both the reactor and the condenser by the steam spraying technique with an aqueous strong alkaline solution of the compound of Example 1 so as to provide an amount of build-up suppressant of 0.63 g/m$^2$. Also in these plant-scale trials, at least eighty consecutive polymerizations were carried out without cleaning the inner walls of the reactor and the condenser before each run, but simply rinsing them with water and applying the build-up suppressant before each polymerization as above indicated. No build-up formation was observed. The same results were achieved by employing the build-up suppressants of Examples 25 and 27.

EXAMPLE 37

Polymerization of vinyl chloride monomer (VCM) in aqueous suspension

The inner walls of a stainless-steel polymerization reactor of 26 m$^3$ capacity were coated by means of the nitrogen spraying technique with an aqueous strong alkaline solution of the compound of Example 25, previously diluted with water in a 1:10 (v:v) ratio, so as to provide an amount of build-up suppressant of 0.75 g/m$^2$. Once the spraying was terminated, the reactor walls were heated for 1 minute at about 60° C. Subsequently, the following ingredients were loaded in parts by weight.

| | |
|---|---|
| VCM | 100 |
| Water | 150 |
| POLIVIC(R)S 404 W (3V SIGMA, Italy) | 0.04* |
| GOHSENOL(R)KH 17 (NIPPON GOHSEI, Japan) | 0.06 |
| bis-(4-tert.-butylcyclohexyl)-peroxi-dicarbonate | 0.03 |
| lauroyl peroxide | 0.04 |

*as active substance

The system was heated to about 59° C., corresponding to a K value of the PVC polymer of about 65, while the pressure raised to 8–10 atmospheres. The polymerization was carried on for about 5 hours. When the pressure decreased by 2–3 atmospheres, the reaction was stopped by venting out and recovering the unreacted monomer. At least eight consecutive polymerizations were carried out without applying the build-up suppressant before each run. No build-up formation was observed. The same results were achieved by employing the build-up suppressants of Examples 8 and 24.

What is claimed is:

1. Build-up suppressor agents comprising condensation products between an aldehyde, a phenol compound and an aromatic carboxylic acid with (a) hydroxyl group(s) on the aromatic nucleus.

2. Build-up suppressor agents according to claim 1, wherein the aldehyde is an aldehyde capable of condensing at ortho- and/or para-positions with respect to a hydroxyl on the aromatic nucleus.

3. Build-up suppressor agents according to claim 1, wherein the phenol compound is a mono- or polyhydroxylated phenol in which at least two of the ortho- and/or para-positions with respect to the hydroxy group or groups are free, or the phenol compound is a compound of formula (I):

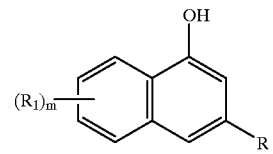

wherein m is 1, 2 or 3, and R and $R_1$ are independently selected from the group consisting of hydrogen, halogen, ($C_{1-5}$) alkyl, hydroxy and carbo($C_{1-5}$)alkoxy.

4. Build up suppressor agents according to claim 1, in acidic form or in the form of the corresponding salts with basic agents.

5. A process for the preparation of a build-up suppressor agent according to claim 1, which comprises reacting the aldehyde, the phenol compound and the aromatic carboxylic acid with (a) hydroxyl group(s) on the aromatic nucleus in the presence of a strong alkali agent, at a temperature ranging from about 40 to about 120° C., for a period of time ranging from about 1 to about 8 hours.

6. A process according to claim 5, wherein the aldehyde, the phenol compound and the aromatic carboxylic acid with (a) hydroxyl group(s) on the aromatic nucleus are reacted in molar ratios ranging, respectively, from 0.6–1.2 mol of aldehyde:0.05–0.95 mol of phenol compound:0.95–0.05 mol of aromatic carboxylic acid with (a) hydroxyl group(s) on the aromatic nucleus.

7. A process according to claim 5, wherein firstly the aldehyde is reacted with the phenol compound or with the aromatic carboxylic acid with (a) hydroxyl group(s) on the aromatic nucleus, to produce a dimethylol compound, and the so obtained dimethylol compound is subsequently reacted with the carboxylic acid with (a) hydroxyl group(s) on the aromatic nucleus or with the phenol compound.

8. Build-up suppressor agents produced by the process of claim 5.

9. A composition having anti-build-up activity containing one or more of the build-up suppressor agents according to claim 1 and a suitable vehicle.

10. A composition according to claim 9, wherein the vehicle is a liquid.

11. A method for suppressing the formation of build-up in the polymerization processes of vinyl chloride or vinyl acetate, or of their mixtures, in the presence or in absence of other monomers or polymers polymerizable with them, which comprises coating the inner walls of a polymerization reactor with one or more of the build-up suppressor agents according to claim 1.

12. A process for the polymerization of vinyl chloride or of vinyl acetate, or of mixtures thereof, in the presence or absence of other monomers or polymers polymerizable with vinyl chloride and/or vinyl acetate, carried out in a reactor whose inner walls are coated with one or more of the build-up suppressor agents according to claim 1.

13. Polymers and copolymers obtained by the process of claim 12.

14. A polymerization reactor whose inner walls are coated with one or more of the build-up suppressor agents according to claim 1.

15. A polymerization process comprising polymerizing a vinyl chloride or vinyl acetate, or mixtures thereof, in the presence or absence of other monomers or polymers polymerizable with vinyl chloride and/or vinyl acetate and in the presence of at least one build-up suppressor agent according to claim 1.

16. Build-up suppressor agents according to claim 1, wherein the aromatic carboxylic acid hydroxylated on the aromatic nucleus is a compound of the formula

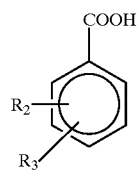

wherein $R_2$ is selected form the group consisting of hydrogen, hydroxy, $(C_{1-5})$alkoxy, $(C_{1-5})$alkyl, hydroxy$(C_{1-5})$alkyl, halogen, phenyl, and hydroxyphenyl and $R_3$ is selected form the group consisting of hydroxy, $(C_{1-5})$alkoxy, $(C_{1-5})$alkyl, hydroxy$(C_{1-5})$alkyl, halogen, phenyl, and hydroxyphenyl, with the proviso that at least one of $R_2$ or $R_3$ represents hydroxy and at least two of the ortho- and/or para-positions with respect to the hydroxyl group or groups is free, or the aromatic carboxylic acid hydroxylated on the aromatic nucleus is a compound of the formula

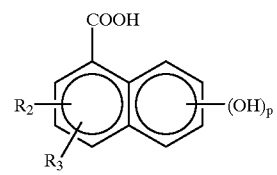

wherein $R_2$ is selected form the group consisting of hydrogen, hydroxy, $(C_{1-5})$alkoxy, $(C_{1-5})$alkyl, hydroxy$(C_{1-5})$alkyl, halogen, phenyl, and hydroxyphenyl, $R_3$ is selected form the group consisting of hydroxy, $(C_{1-5})$alkoxy, $(C_{1-5})$alkyl, hydroxy$(C_{1-5})$alkyl, halogen, phenyl, and hydroxyphenyl, and p is an integer selected from 1 or 2, with the proviso that at least two of the ortho- and/or para-positions with respect to the hydroxyl group or groups must be free.

* * * * *